May 10, 1966            G. LYSLE            3,250,194

FILM TRANSPORT MECHANISM FOR PANORAMIC AERIAL CAMERA

Original Filed Jan. 7, 1963            2 Sheets-Sheet 1

May 10, 1966     G. LYSLE     3,250,194

FILM TRANSPORT MECHANISM FOR PANORAMIC AERIAL CAMERA

Original Filed Jan. 7, 1963     2 Sheets-Sheet 2

3,250,194
FILM TRANSPORT MECHANISM FOR PANORAMIC AERIAL CAMERA

Gordon Lysle, Greenlawn, N.Y., assignor to Fairchild Camera and Instrument Corporation, a corporation of Delaware
Original application Jan. 7, 1963, Ser. No. 249,693, now Patent No. 3,160,082, dated Dec. 8, 1964. Divided and this application Aug. 17, 1964, Ser. No. 389,914
2 Claims. (Cl. 95—31)

This application is a division of applicant's pending application Serial No. 249,693, filed Jan. 7, 1963, now Patent No. 3,160,082, issued Dec. 8, 1964.

This invention relates to panoramic aerial cameras and particularly to such cameras suitable for use in aerial photographic reconnaissance.

In aerial photographic reconnaissance, the use of a panoramic camera with some form of image-motion compensation has found wide application. In such a camera, the film is generally transported past an exposure slit in the focal plane of the camera lens in a direction transverse to the direction of flight of the aircraft. It is necessary to provide some mechanism for compensating for the apparent motion of the image at the focal plane, due to the motion of the aircraft. If the axis of the optical system of the camera is maintained in a fixed attitude, then the apparent image motion is substantially constant and the problem of image-motion compensation is not difficult.

However, for panoramic aerial photography, particularly at relatively low altitudes, it becomes advantageous to use some form of optical scanner and the well-known multi-dove prism scanner has been found particularly suitable for this purpose. However, such a prism is rotated at uniform angular velocity so that the apparent image velocity at the focal plane varies over a wide range from a maximum, when the optical axis is vertical, to a minimum as the optical axis approaches the horizon. Heretofore, there has been no satisfactory method of compensating such cyclically varying apparent image motion.

It is an object of the invention therefore, to provide a new and improved panoramic aerial camera including an optical scanner which is particularly suitable for use in photographic reconnaissance work, in which the apparent image velocity at the focal plane varies over a wide range of values over the scanning cycle.

It is another object of the invention to provide a new and improved panoramic aerial camera including an optical scanner and including mechanism for effectively compensating for the cyclically varying velocity of the image motion at the focal plane.

In accordance with the invention, there is provided a film transport for a panoramic aerial camera including an exposure slit comprising film take-up and supply spools, a continuously rotatable constant-speed driving mechanism, a friction metering puck driven by such mechanism and engaging the film on the take-up spool, and a friction roller engaging the film in the vicinity of the exposure slit and driven by the driving mechanism, such friction roller having an effective driving engagement with the film over substantially one-half of its periphery and the relative dimensions of the metering puck and the friction roller being such that the intermittent motion of the film past the exposure slit has an average velocity substantially equal to the peripheral velocity of the metering puck.

For a better understanding of the present invention, together with other and further objects thereof, reference is had to the following description, taken in connection with the accompanying drawings, while its scope will be pointed out in the appended claims.

Referring now to the drawings:

FIG. 3 is a cross-sectional detail view of the apparatus of FIG. 2, while

Figure 1:
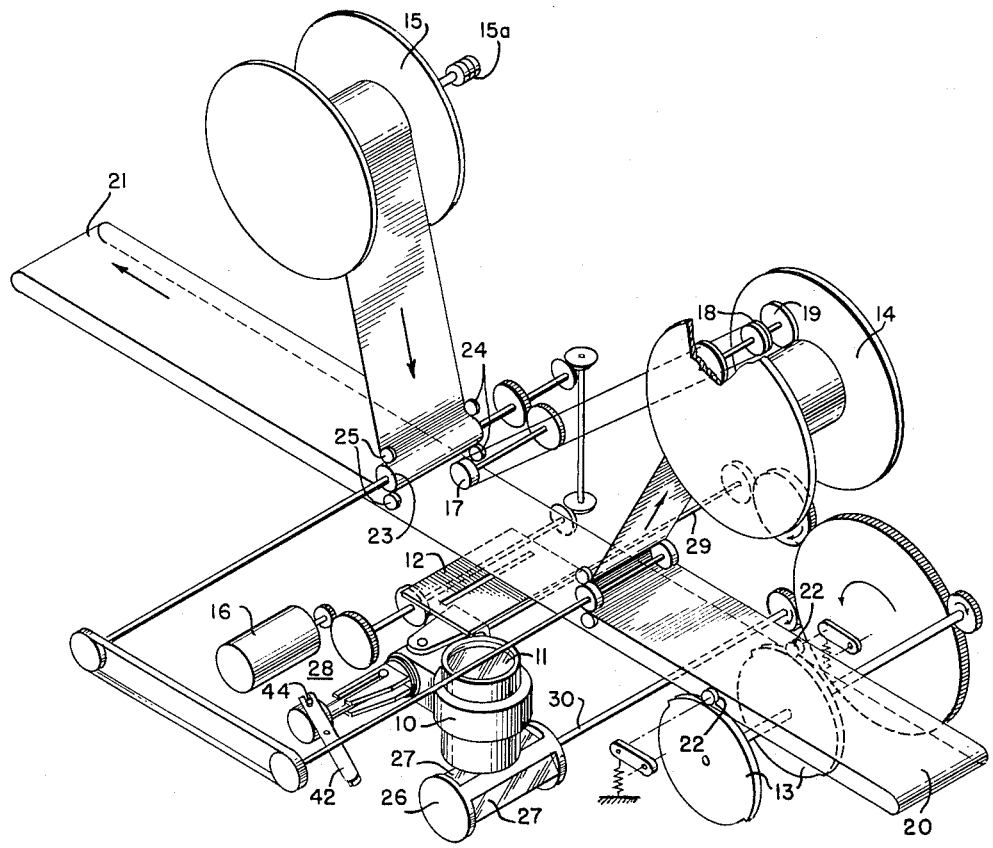
FIG. 1 is a schematic exploded perspective view of a panoramic aerial camera structure embodying the present invention.

Referring now to FIG. 1 of the drawings, there is illustrated, in perspective, the essential structure of a panoramic aerial camera, the frame and casing being omitted for the sake of clarity. This structure includes a lens holder 10 including one or more lens elements 11, which may be of conventional construction, and an exposure slit plate 12 disposed in the focal plane of the lens system. The structure also includes a film transport for intermittently moving film in the focal plane of the lens system and past the exposure slit plate 12, although, for clarity of illustration, the exploded view of FIG. 1 shows the lens element 11, the slit plate 12, and the film widely separated. This film transport includes a pair of friction rollers 13, 13 each having an active perimeter substantially equal to the length of a frame of film. The film transport further includes a film-take-up spool 14, a film-supply spool 15 having a friction brake 15a and a continuously rotatable constant-speed driving mechanism for the film transport.

The driving mechanism for the film transport includes a continuously rotatable constant-speed motor 16 which, through suitable gearing, pulleys 17, 18, and a friction drive puck 19, engages the stock of film on the take-up spool 14. By this driving mechanism, film is taken up at a constant or metered rate, irrespective of the diameter of the film stock on the spool 14.

The friction rollers 13, 13 for intermittently advancing the film past the exposure slit plate 12 are, as illustrated, disposed in the general vicinity of the exposure slit and are driven by the motor 16 through suitable gearing mechanism. Each of the rollers 13, 13 has an effective driving engagement with the film over substantially one-half of its periphery. Specifically, each of these rollers is undercut over substantially one-half of its periphery so as to disengage it from the film during the interval between frames when the film does not move across the exposure slit but is being taken up from a take-up loop 20 and is being stored in a supply loop 21. For clarity, the loops 20 and 21 are shown extending laterally although, actually, they constitute free loops falling into slack boxes provided for that purpose. The driving engagement between the rollers 13, 13 and the film is maintained by spring-biased pinch rollers 22, 22 while the feeding of film into the supply loop 21 during the interval between frame exposures is effected by a friction roller 23 and cooperating pinch rollers 24, 24 and 25, 25. The relative dimensions of the drive puck 19 and the rollers 13, 13 are such that the intermittent motion of the film past the exposure slit has an average velocity equal to the peripheral velocity of the puck 19.

The panoramic camera structure of FIG. 1 also comprises an optical system including a continuously rotatable optical scanner 26 disposed ahead of the lens system in the lens holder 10 for scanning the scene to be photographed. Preferably, as illustrated, the scanner 26 includes a pair of dove lenses 27, 27 mounted in a suitable holder driven at constant speed by the motor 16 through a suitable gear mechanism. The optical system further includes image-motion compensating mechanism 28 including means for sinusoidally oscillating the lens holder 10 substantially parallel to the axis of rotation of the scanner 26, the period of such oscillation being one-half of the period of rotation of the scanner. This image-motion compensating mechanism is driven by a shaft 29 continuously rotatable at a speed which is double that of the shaft 30 driving the scanner 26.

Figure 2:
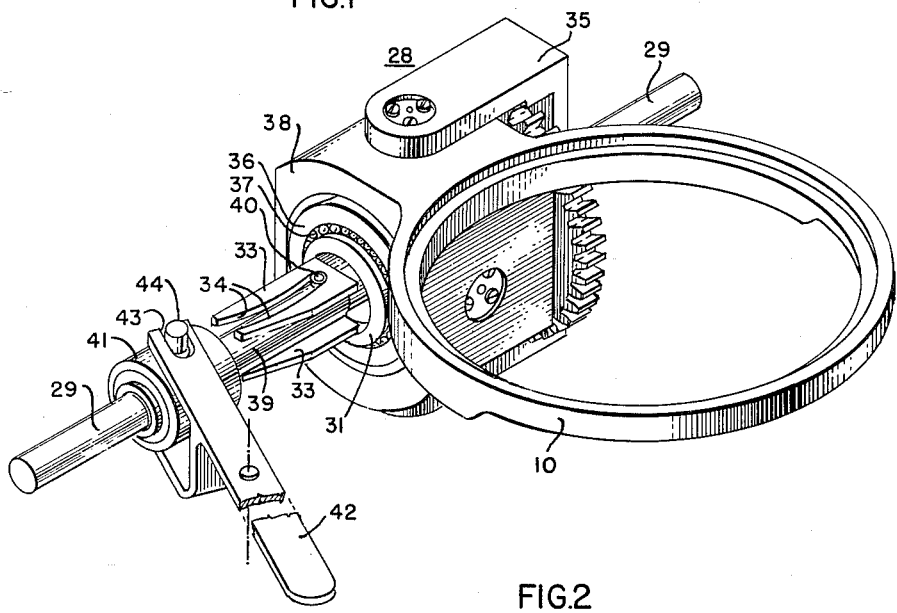
FIG. 2 is a perspective view of the image-motion compensating mechanism of the system of FIG. 1.
Figure 3:
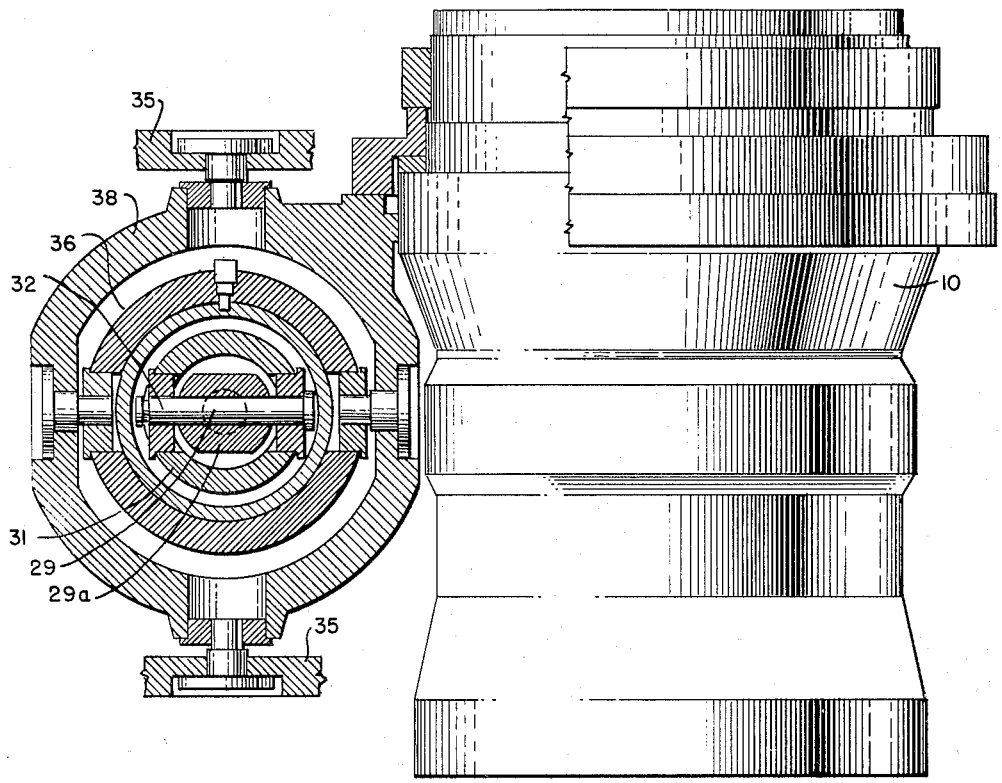
Figure 4:
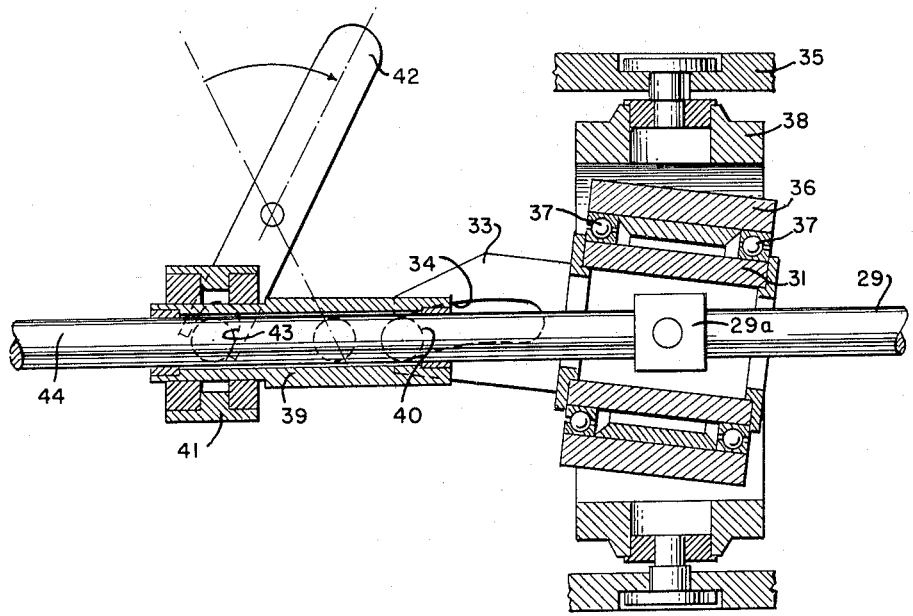
FIG. 4 is a longitudinal sectional detail view of the apparatus of FIG. 2.

The image-motion compensating mechanism is shown in more detail in FIGS. 2, 3, and 4, reference being made to FIG. 2 for the general layout of the mechanism elements and to FIGS. 3 and 4 for the details of construction of the several elements, the elements in FIGS. 3 and 4 corresponding to those in FIG. 2 being identified by the same reference characters. Referring now to FIG. 2, the image-motion compensating mechanism 28 includes an annular member 31 pivotally mounted on the input shaft 29 specifically, as shown in FIG. 3, pivoted transversely thereto by means of a pivot pin 32 passing through an enlargement 29a of shaft 29 so that it is rotatable therewith and is normally coaxial therewith. The member 31 has a pair of axially extending arms 33, 33 provided with axially extending cam slots 34, 34 inclined to the axial plane of the member 31.

The image-motion compensating mechanism further comprises a universal support for mounting the mechanism 28 from a frame element 35 of the camera. The universal support includes an inner gimbal ring 36 in which the member 31 is rotatably supported, as by means of the antifriction bearings 37 (FIG. 4). The universal support also includes an outer gimbal ring 38 secured to the lens holder 10 and shown as being structurally integral therewith. The outer gimbal ring 38 is, as illustrated, pivotally mounted in the frame 35.

The image-motion compensating mechanism further comprises means for tilting the axis of the rotatable member 31 relative to that of the shaft 29, thereby sinusoidally to oscillate the outer gimbal ring 38 and the lens holder 10 to compensate for the apparent image motion. The tilting means comprises a cam actuator including a rotatable element 39 axially slidable along the shaft 29 but rotatable therewith and having a projecting pin 40 engaging the cam slot 34. The tilting means also includes a nonrotatable element 41 in which the rotatable element 39 is journalled and means for adjusting the axial position of the elements 39 and 41 to adjust the axis of the rotatable member 31, this latter means being in the form of a pivoted lever 42 having a slotted end 43 engaging a pin 44 projecting from the member 41.

It is believed that the operation of the panoramic aerial camera and its image-motion compensating mechanism will be clear from the foregoing description. Referring again to FIG. 1, as the motor 16 continuously rotates the friction rollers 13, 13, they intermittently engage the film and advance it the length of one film frame. During the motion of the film past the exposure slit plate 12, the lens holder 10 is oscillated sinusoidally substantially parallel to the scanner 26 (as described hereinafter), this sinusoidal motion compensating for the apparent image motion at the focal plane due to the motion of the aircraft on which the camera is carried, the motion of the aircraft being assumed to be parallel to the axis of rotation of the scanner 26. The scanner 26 is effective in a well-known manner to sweep the field of view past the exposure slit of the plate 12 synchronously with the motion of the film so as to expose a frame of film. Concurrently, the sinusoidal oscillation of the lens holder 10 compensates for the apparent image motion due to the transverse motion of the aircraft. It will be understood that if the optical axis of the lens system were maintained vertical, the motion of the lens holder 10 should be linear. However, as the scanner 26 exposes the film to an element of the object approaching the horizon, the apparent image motion is much less. It has been established that the variation in this apparent image motion is a substantially sinusoidal function of the angular position of the scanner 26 so that it may be compensated by a sinusoidal motion of the lens holder 10. While theoretically this motion should be rectilinear and parallel to the axis of the scanner 26, it has been found that, in the limited motion required, the arcuate movement of the lens holder 10 approximates to an adequate degree a rectilinear movement substantially parallel to the axis of the scanner 26.

Upon movement of the film past the exposure slit by one frame, the rollers 13, 13 disengage the film so that the film at the exposure slit remains stationary for approximately one-half of the rotation of the rollers 13, 13. During this interval, nevertheless, the driving puck 19 continues to take up film from the take-up loop 20 while the friction roller 23 feeds film into the supply loop 21. The dimensions of the driving puck 19, friction rollers 13, 13, and the driving roller 23 are such that the constant film velocity at the take-up spool 14 and the supply spool 15 is equal to the average velocity of the film at the exposure slit, the difference between the instantaneous velocities during the exposure period being made up by taking film from or adding film to the take-up loop 20 and the supply loop 21, as required.

Since the scanner 26 effects two complete scansions of the field of view for each rotation, the period of oscillation of the lens holder 10 should be one-half that of the period of rotation of the scanner 26.

Referring now again to FIGS. 2, 3, and 4 of the drawings, it will be seen that if the position of the operating lever 42 is such that the pin 40 engages the cam slot 34 at its root, which lies in the axial plane of the rotatable member 31, as shown in FIG. 2, the member 31 and its associated inner gimbal ring 36 will be coaxial with the shaft 29 and there will be no oscillation of the outer gimbal ring 38 and lens holder 10 and no image-motion compensation. Upon adjustment of the lever 42 to tilt the axis of the member 31 and inner gimbal ring 36 relative to the axis of the shaft 29, as illustrated in FIG. 4, it can be shown that a sinusoidal oscillation is imparted to the outer gimbal ring 38 and its integral lens holder 10, the amplitude of this sinusoidal oscillation depending upon the position of the adjusting lever 42, and the law of variation of the amplitude of such oscillation with displacement of the lever 42 being determined by the configuration of the cam slot 34. Therefore, by adjusting the lever 42, the amount of image-motion compensation can be varied in any desired manner, for example, directly with variations in the speed of the aircraft and inversely with variations in its altitude.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the innvention.

What is claimed is:

1. A film transport for a panoramic aerial camera including an exposure slit comprising:
   (a) film take-up and supply spools;
   (b) a continuously rotatable constant-speed driving mechanism;
   (c) a friction metering puck driven by said mechanism and engaging the film on said take-up spool;
   (d) and a friction roller engaging the film in the vicinity of the exposure slit and driven by said mechanism;
   (e) said roller having an effective driving engagement with the film over substantially one-half of its periphery,
   (f) and the relative dimensions of said puck and said roller being such that the intermittent motion of the film past the exposure slit has an average velocity substantially equal to the peripheral velocity of said puck.

2. A film transport for a panoramic aerial camera including an exposure slit comprising:
   (a) film take-up and supply spools;

(b) a continuously rotatable constant-speed driving mechanism;
(c) a friction metering puck driven by said mechanism and engaging the film on said take-up spool;
(d) and a friction roller engaging the film in the vicinity of the exposure slit and driven by said mechanism;
(e) said roller being undercut over substantially one-half of its periphery to disengage it from the film, thereby having an effective driving engagement with the film over substantially one-half of its periphery,
(f) and the relative dimensions of said puck and said roller being such that the intermittent motion of the film past the exposure slit has an average velocity substantially equal to the peripheral velocity of said puck.

References Cited by the Examiner
UNITED STATES PATENTS

| | | | |
|---|---|---|---|
| 2,639,868 | 5/1953 | Trofimov | 242—75.5 |
| 2,796,009 | 6/1957 | Doyle et al. | 95—12.5 |
| 2,953,965 | 9/1960 | Stiffler | 352—184 X |

NORTON ANSHER, *Primary Examiner.*